United States Patent Office 3,405,068
Patented Oct. 8, 1968

3,405,068
GAS GENERATION
Ralph H. Hiltz, Pittsburgh, Pa., assignor to Mine Safety Appliances Company, Pittsburgh, Pa., a corporation of Pennsylvania
No Drawing. Filed Apr. 26, 1965, Ser. No. 451,000
6 Claims. (Cl. 252—182)

ABSTRACT OF THE DISCLOSURE

Solid compositions, stable at ambient temperatures, are used for gas generation, the compositions evolving a gas when heated to initiate reaction between components of the composition. The compositions contain a water reactive material, for example, metal hydrides, metal borohydrides or metal superoxides, and a material that releases water at elevated temperatures.

---

This invention relates to the generation of gases, and more particularly to solid compositions that evolve gas on heating.

There is a need, particularly in the field, for a safe and convenient source of various gases for many purposes, such as, for example, hydrogen for balloon filling and welding, oxygen for welding, and acetylene for welding or illuminating gas. Gases are generally carried in cylinders, which are cumbersome and a potential safety hazard, or are generated by solid-liquid reactions utilizing more or less complex and inconvenient generating apparatus.

It is an object of this invention to provide an improved gas source. Another object is to provide a solid composition that will evolve gas merely by heating. Still another object is to provide an easily portable, safe and efficient gas source. Other objects will be apparent from the following description and claims.

In accordance with this invention, a finely divided solid reactive with water is intimately mixed with a finely divided solid containing combined water to form a composition that is stable at ambient and usual storage temperatures and that will evolve a gas when heated, the gas produced depending on the particular water-reactive materials used. The composition may be a loose mixture, suitably contained in canisters or bags, but preferably it is compressed under sufficient pressure to form a coherent solid body such as a pellet.

A large number of compounds are known that evolve various gases on reaction with water, any of which may be used in this invention when associated with an appropriate water-containing material. For example, hydrogen is produced from the reaction of water with alkali and alkaline earth metal hydrides or borohydrides, acetylene is produced from calcium carbide, hydrogen chloride is produced from aluminum chloride, ammonia is produced from metal amides, and oxygen is produced from metal peroxides or superoxides. Catalysts are known to promote reaction in some systems, such as, for example, the catalysis by transition metal chlorides of the reaction of sodium borohydride or potassium borohydride with water. Water reactive components as used herein are deemed to include mixtures of a primary reactant and catalysts.

In suitable water-containing materials the combined water is firmly bound at ambient or storage temperatures and less firmly bound at elevated temperatures, as evidenced by an increase of their vapor pressure with increasing temperatures. Generally, a higher vapor pressure indicates a greater availablity of the combined water for reaction. Thus, compositions containing a water-reactive component and a potentially reactive material containing combined water may be stable at normal temperatures and reaction can be initiated simply by heating to make the combined water available for reaction. The temperature at which reaction is initiated may be adjusted by selection of the water-containing material, those with a higher vapor pressure giving a lower reaction temperature.

Suitable water-containing materials include compounds containing coordinated water, compounds containing uncoordinated water of crystallization, olated compounds, and other compounds in which the water is chemically combined.

Compounds containing coordinated water are those in which water molecules are attached to the metal atom or atoms of a salt in an orderly arrangement. Representative examples of such compounds include certain metal chlorides such as $Cr(H_2O)_6Cl_3$ and $Sn(H_2O)_2Cl_4$, and amphoteric hydroxides such as $Na_2B_4O_7 \cdot 10H_2O$,

and $Na_2ZnO_2 \cdot 4H_2O$.

Uncoordinated water of crystallization is associated with a salt or hydroxide molecule and is not as firmly bound as coordinated water. Representative examples of compounds containing uncoordinated water include

$MgCl_2 \cdot 6H_2O$, and $Ce_2(SO_4)_3 \cdot 8H_2O$.

It should be recognized that many materials may contain both coordinated and uncoordinated water, such as, for example, alums which contain 6 molecules of coordinated water and 6 molecules of uncoordinated water. Such materials are suitable for use and, if desired, the uncoordinated water may be removed by dessication or heating before use in the compositions of this invention. Representative examples of materials containing both coordinated and uncoordinated water include

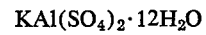

$ZrOCl_2 \cdot 8H_2O$, and $Sr(OH)_2 \cdot 8H_2O$.

Olated compounds are compounds in which metal atoms are joined by bridging OH groups and thus are sometimes refered to as hydroxides. Upon heating, however, olated compounds give up water and revert to oxy-metal compounds. Representative examples of olated compounds are the basic metal chlorides and sulfates such as $Cr_5(OH)_6Cl_9$ and $[Al_2(OH)_5]_2SO_4$.

Other compounds that contain chemically combined water that is released or partially released on heating can also be used in this invention, such as, for example, boric acid, calcium hydroxide, and group IB, IIA, and IIB (Mendeleeff) metal hydroxides.

Illustrative of the invention, a preferred composition for the generation of hydrogen contains sodium or potassium borohydride, a catalyst, and a compound containing combined water that has a vapor pressure of less than about 8 mm. of Hg at 20° C., preferably of less than about 4 mm. Hg at 20° C. It is preferred to use a stoichiometric amount of borohydride and water-containing material (based on available water content) as such proportions give the highest yield of hydrogen per pound of gas-generating solid, and there is no advantage in using proportions other than stoichiometric.

In one example, 9.5 g. of $NaBH_4$, 20.9 g. of $LiOH \cdot H_2O$, and 0.5 g. of anhydrous $CoCl_2$ were intimately mixed and compressed into a coherent pellet at 4000 p.s.i.g. These pellets are stable at ordinary temperatures when protected from atmospheric moisture. When the pellets are heated to about 130° F. in a test tube having a gas outlet, hydrogen evolution commences and, once initiated, the reaction is self-sustaining without additional application of heat. A 98% yield of $H_2$ of about 99% purity was evolved over a period of two minutes. Eleven cubic feet of hydrogen (STP) are produced for each pound of this gas-generating composition.

In another example, 9.5 g. of powdered $NaBH_4$, 22.5 g. of powdered $Cr(H_2O)_6Cl_3$ and 0.5 g. of anhydrous $CoCl_2$ were compacted as in the previous example. The pellet, stable at ambient temperature, evolved substantially pure hydrogen in 85% yield from the self-sustaining reaction initiated by heating to about 150° F. Similarly, pellets stable at ambient temperature containing 9.5 g. $NaBH_4$, 30 g. $ZrOCl_2 \cdot 4H_2O$ and 0.5 g. $CoCl_2$ gave a 98% yield of 99.9% pure hydrogen when reaction was initiated by heating to 150° F.

The major purity in the hydrogen produced is water and the amount of water decreases with increasing density of the compact.

Any of the well-known solid catalysts for accelerating the reactions of borohydrides and water can be used, provided they do not contain any adsorbed or uncoordinated water. Such catalysts include any acidic material, those materials of high acidity and water solubility being most effective. Acid metal chlorides, which appear to react with the borohydride to produce a highly active catalyst, are preferred catalysts. Representative examples of suitable catalysts include phthalic acid, salicylic acid, benzoic acid, sulfamic acid, oxalic acid, succinic acid, citric acid, tartaric acid, ammonium chloride, aluminum chloride, iron (II) chloride, cobalt (II) chloride, nickel (II) chloride, boric acid, acid sulfates and diacid phosphates.

When the water-reactive material is highly reactive, such as, for example, sodium superoxide ($NaO_2$), potassium superoxide ($KO_2$) calcium carbide ($CaC_2$), aluminum chloride ($AlCl_3$), sodamide ($NaNH_2$), potassamide ($KNH_2$), lithium borohydride ($LiBH_4$), and calcium hydride ($CaH_2$), only those water-containing materials containing no uncoordinated water and having a vapor pressure of less than about 0.1 mm. of mercury at 20° C. can be used, such as, for example $Cr(H_2O)_6Cl_3$, boric acid, and group IIA, IB, and IIB hydroxides. Illustrative examples of such compositions, each of which generates one mole of the designated gas, include: 94.8 g. of $KO_2$ and 27.48 g. $H_3BO_3$ to produce oxygen, 64.10 g. $CaC_2$ and 82.44 g. $H_3BO_3$ to produce acetylene, 21.05 g. $CaH_2$ and 41.22 g. $H_3BO_3$ to produce hydrogen, 22.22 g. $AlCl_3$ and 13.74 g. $H_3BO_3$ to produce hydrogen chloride and 39.02 g. $NaNH_2$ and 41.22 g. $H_3BO_3$ to produce ammonia. In each of these examples, the reaction is initiated by heating to 130° F. and is self-sustaining if heated to about 150–160° F.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:
1. A solid composition which evolves gas on heating comprising a coherent compact of an intimate mixture of a finely divided first component reactive with water to produce a gas selected from the group consisting of alkali and alkaline earth metal borohydrides, alkali and alkaline earth metal hydrides, alkali metal superoxides, aluminum chloride and calcium carbide, and a finely divided second component containing combined water and being inert to said first component at ambient temperature selected from the group consisting of compounds containing coordinated water, compounds containing uncoordinated water, boric acid, calcium hydroxide, $Cr_5(OH)_6Cl_9$ and $Al_2(OH)_5SO_4$, said second component releasing an amount of water when heated to substantially stoichiometrically react with said first component, said composition autogenously reacting to generate said gas when reaction is initiated by heating.

2. An oxygen generating composition according to claim 1 in which the first component is selected from the group consisting of sodium superoxide, potassium superoxide and mixtures thereof, and the second component has a vapor pressure less than about 0.1 mm. Hg at 20° C.

3. A composition according to claim 2 which contains an effective amount of a catalyst for accelerating the reaction of said borohydrides with water.

4. A hydrogen generating composition according to claim 1 in which the first component is selected from the group consisting of sodium borohydride, potassium borohydride and mixtures thereof, and the second component has a vapor pressure of less than about 8 mm. Hg at 20° C.

5. A composition according to claim 3 in which the catalyst is cobalt (II) chloride.

6. A composition according to claim 3 in which the second component is selected from the group consisting of $Cr(H_2O)_6Cl_3$, $ZrOCl_2 \cdot H_2O$ and $LiOH \cdot H_2O$.

References Cited

UNITED STATES PATENTS 2,906,668  9/1959  Beekman _____ 23—367
3,120,782  2/1964  Lee et al. _____ 252—188.3

OTHER REFERENCES

Gerrard: The Organic Chemistry of Boron, Academic Press, New York, 1961, p. 132.

The Merck Index, Sixth Edition, Merck and Co., Inc., New Jersey, 1952, p. 156.

The Condensed Chemical Dictionary, Sixth Edition, Reinhold Publishing Corporation, 1961, p. 1254.

LEON D. ROSDOL, *Primary Examiner.*

STANLEY D. SCHWARTZ, *Assistant Examiner.*